United States Patent
Kerzner et al.

(10) Patent No.: US 12,322,120 B2
(45) Date of Patent: Jun. 3, 2025

(54) MONITORING DELIVERED PACKAGES USING VIDEO

(71) Applicant: Alarm.com Incorporated, Tysons, VA (US)

(72) Inventors: Daniel Todd Kerzner, McLean, VA (US); Allison Beach, Leesburg, VA (US); Donald Gerard Madden, Columbia, MD (US); Ethan Shayne, Clifton Park, NY (US)

(73) Assignee: Alarm.com Incorporated, Tysons, VA (US)

( * ) Notice: Subject to any disclaimer, the term of this patent is extended or adjusted under 35 U.S.C. 154(b) by 362 days.

(21) Appl. No.: 17/836,167

(22) Filed: Jun. 9, 2022

(65) Prior Publication Data

US 2022/0398750 A1 Dec. 15, 2022

Related U.S. Application Data

(60) Provisional application No. 63/210,728, filed on Jun. 15, 2021.

(51) Int. Cl.
  *G06T 7/246* (2017.01)
  *G06Q 10/0833* (2023.01)
  (Continued)

(52) U.S. Cl.
  CPC ......... *G06T 7/251* (2017.01); *G06Q 10/0833* (2013.01); *G06V 10/62* (2022.01);
  (Continued)

(58) Field of Classification Search
  CPC ........ G08B 13/19608; G08B 13/19613; G08B 13/19652; G08B 13/19656; G04N 7/186;
  (Continued)

(56) References Cited

U.S. PATENT DOCUMENTS

| | | | |
|---|---|---|---|
| 7,222,081 B1 * | 5/2007 | Sone | G06Q 10/08 |
| | | | 705/333 |
| 10,043,332 B2 * | 8/2018 | Scalisi | H04N 7/186 |
| (Continued) | | | |

OTHER PUBLICATIONS

Mashita, Tomohiro, et al. "Simulation based Camera Localization under a Variable Lighting Environment." ICAT-EGVE. 2016. (Year: 2016).*

(Continued)

*Primary Examiner* — Gandhi Thirugnanam
*Assistant Examiner* — Connor L Hansen
(74) *Attorney, Agent, or Firm* — Fish & Richardson P.C.

(57) ABSTRACT

Disclosed are methods, systems, and apparatus for monitoring delivered packages using video. A method includes obtaining a notification of a delivery of a package at a property that includes a first image depicting the package; obtaining a second image captured by a camera at the property; determining, using the first image and the second image, that the package has been delivered to the property; generating a package model that represents an appearance of the package; and tracking a location of the package for use in determining whether to provide an alert to a device about the location of the package. Determining that the package has been delivered to the property comprises: comparing the first image to a model of a scene of the property; determining that the first image satisfies similarity criteria for matching the model of the scene; and determining that the second image likely depicts the package.

18 Claims, 5 Drawing Sheets

(51) Int. Cl.
  *G06V 10/62* (2022.01)
  *G06V 10/74* (2022.01)
  *G06V 10/764* (2022.01)
  *H04N 7/18* (2006.01)

(52) U.S. Cl.
  CPC .......... *G06V 10/761* (2022.01); *G06V 10/764* (2022.01); *H04N 7/183* (2013.01); *G06T 2207/10016* (2013.01)

(58) Field of Classification Search
  CPC .......... G06T 7/251; G06T 2207/10016; G06V 10/761; G06V 10/62; G06V 10/764; G06V 10/771; G06V 20/39; G06V 20/52; G06Q 10/0833; H04N 7/183; G01N 2201/102
  See application file for complete search history.

(56) References Cited

U.S. PATENT DOCUMENTS

| | | | |
|---|---|---|---|
| 10,074,227 B1* | 9/2018 | Berenberg | G07C 9/00904 |
| 10,627,244 B1* | 4/2020 | Lauka | G01C 21/3623 |
| 10,657,483 B2* | 5/2020 | Lyman | G06Q 10/083 |
| 10,853,757 B1* | 12/2020 | Hill | G06Q 10/0833 |
| 11,151,509 B1* | 10/2021 | Mishra | G06Q 10/08355 |
| 11,250,270 B1* | 2/2022 | Li | G06V 20/52 |
| 11,861,546 B1* | 1/2024 | Wang | G06Q 10/0832 |
| 11,900,686 B1* | 2/2024 | Wang | G06V 20/56 |
| 2009/0297023 A1* | 12/2009 | Lipton | G06V 10/28 |
| | | | 382/164 |
| 2015/0120598 A1* | 4/2015 | Fadell | G06Q 10/083 |
| | | | 705/333 |
| 2015/0145643 A1* | 5/2015 | Fadell | G07C 9/27 |
| | | | 340/5.51 |
| 2016/0048741 A1* | 2/2016 | Nguyen | G06F 18/214 |
| | | | 382/155 |
| 2018/0285653 A1* | 10/2018 | Li | G08B 25/08 |
| 2019/0034734 A1* | 1/2019 | Yen | G06F 18/2413 |
| 2019/0034873 A1* | 1/2019 | Boitel | G08B 31/00 |
| 2019/0102730 A1* | 4/2019 | Giorgi | G06Q 10/0833 |
| 2019/0161190 A1 | 5/2019 | Gil et al. | |
| 2019/0303684 A1* | 10/2019 | Khadloya | G07C 9/00896 |
| 2019/0370980 A1* | 12/2019 | Hollander | G06V 20/41 |
| 2020/0082690 A1* | 3/2020 | Bunker | H04N 7/186 |
| 2020/0134996 A1 | 4/2020 | Siminoff et al. | |
| 2020/0288895 A1* | 9/2020 | Bennet | G06Q 10/08 |
| 2021/0248553 A1* | 8/2021 | Zhang | B60R 25/20 |
| 2021/0342775 A1* | 11/2021 | Herberger | G06Q 10/0833 |
| 2022/0027637 A1* | 1/2022 | Madden | G08B 13/19645 |
| 2022/0083964 A1* | 3/2022 | Silverstein | G06Q 30/0282 |
| 2022/0129841 A1* | 4/2022 | Gutke | G08B 13/19602 |
| 2024/0127164 A1* | 4/2024 | Shayne | G08B 13/00 |

OTHER PUBLICATIONS

Mashita, Tomohiro, et al. "Simulation based Camera Localization under a Variable Lighting Environment." ICAT-EGVE. 2016. (Year: 2016) (Year: 2016).*

* cited by examiner

MONITORING DELIVERED PACKAGES USING VIDEO

CROSS-REFERENCE TO RELATED APPLICATIONS

This application claims the benefit of the U.S. Provisional Patent Application No. 63/210,728, filed Jun. 15, 2021, which is incorporated herein by reference in its entirety.

TECHNICAL FIELD

This disclosure application relates generally to monitoring systems.

BACKGROUND

Many properties are equipped with monitoring systems that include sensors and connected system components. Monitoring systems can receive and analyze data from sensors that are internal and external to the property. Some monitoring systems include cameras.

Delivery services can deliver packages to a property. In some cases, upon delivering a package to a property, a delivery person may take a photograph of the package and send the photograph to a resident of the property, e.g., through a mobile application, text message, or electronic mail.

SUMMARY

Techniques are described for monitoring delivered packages using video. Video can be captured by a camera installed at a property. For example, the camera may be a doorbell camera that is installed at a door of a property and that can capture images of a package delivered to the property.

However, installed cameras may have a limited and fixed field of view. Thus, installed cameras might not be able to capture images of the package after the package has been delivered. Additionally, the appearance and structure of the package may not be clear from the view of an installed camera, which can cause complications in monitoring the package and guarding against theft.

The disclosed techniques can be used to monitor a delivered package by analyzing delivery images as the resident receives delivery notifications. The techniques can use the delivery images as well as other imagery and sensor data captured at the property to verify that the package was delivered to the correct property. The images can also be used to track the package after delivery to determine if the package is moved or removed. The images can also be used to build a model of the package delivery scene.

In general, innovative aspects include a method including actions of: obtaining a notification i) of a delivery of a package at a property ii) that includes a first image depicting the package; obtaining a second image captured by a camera at the property; determining, using the first image and the second image, that the package has been delivered to the property; generating a package model that represents an appearance of the package; and tracking, using the package model, a location of the package for use in determining whether to provide an alert to a device about the location of the package.

Other embodiments of this and other aspects include corresponding systems, apparatus, and computer programs, configured to perform actions of the methods encoded on computer storage devices. A system of one or more computers or other processing devices can be so configured by virtue of software, firmware, hardware, or a combination of them installed on the system that in operation cause the system to perform the actions. One or more computer programs can be so configured by virtue of a non-transitory computer-readable medium storing software having instructions that, when executed by data processing apparatus, cause the apparatus to perform the actions.

These and other embodiments may each optionally include one or more of the following features. In some implementations, determining, using the first image and the second image, that the package has been delivered to the property includes: comparing the first image depicting the package to a model of a scene of the property; determining that the first image satisfies similarity criteria for matching the model of the scene of the property; determining that the second image likely depicts the package; and in response to determining that the first image satisfies similarity criteria for matching the model of the scene of the property and determining that the second image likely depicts the package, determining that the package has been delivered to the property.

In some implementations, the scene includes an area of the property where packages are likely to be delivered.

In some implementations, the method includes generating the model of the scene using camera images of the scene captured from multiple perspectives.

In some implementations, the method includes generating the model of the scene using images of packages included in notifications of package deliveries.

In some implementations, the method includes generating the package model using the first image and the model of the scene.

In some implementations, generating the package model includes: identifying a group of pixels in the first image that do not match the model of the scene; and classifying, within the group of pixels, a subset of pixels as corresponding to the package.

In some implementations, classifying the subset of pixels as corresponding to the package includes determining that the subset of pixels do not lie in a ground plane of the first image.

In some implementations, the method includes: selecting, from a plurality of versions of the model of the scene, a particular version of the model of the scene for generating the package model.

In some implementations, the plurality of versions of the model of the scene include versions for various environmental conditions. The method includes: selecting the particular version of the model of the scene that has an environmental condition that satisfies a similarity threshold with a current environmental condition at the property.

In some implementations, determining that the package has been delivered to the property includes: comparing the first image depicting the package to the second image captured by the camera at the property; and determining, based on the comparing, that the first image satisfies similarity criteria for matching the second image.

In some implementations, obtaining the second image captured by the camera at the property includes: determining a particular time associated with the first image; and obtaining, from the camera at the property, a set of images captured during a range of time that includes the particular time. The set of images includes the second image.

In some implementations, the particular time associated with the first image includes one of: a time when the first image was captured; a time when the notification of the delivery of the package was obtained; or a time when the package was delivered.

In some implementations, the second image is captured at a first time, and tracking the location of the package using the package model includes: obtaining a third image captured by the camera at the property. The third image is captured after the second image; comparing the third image captured by the camera at the property to the package model; and based on determining that an appearance of the package in the third image does not satisfy similarity criteria for matching the package model, determining that the package has been moved.

In some implementations, the second image is captured at a first time, and tracking the location of the package using the package model includes: obtaining a third image captured by the camera at the property. The third image is captured after the second image. The method includes comparing the third image captured by the camera at the property to the package model; and based on determining that an appearance of the package in the third image satisfies similarity criteria for matching the package model, determining that the package has not been moved.

In some implementations, the method includes determining, based on tracking a location of the package using the package model, that the package has been moved; and providing a notification to a resident of the property indicating that the package has been moved.

In some implementations, the method includes receiving a confirmation that the package has been retrieved by an authorized person; and determining to stop tracking the location of the package.

In some implementations, the package model includes a model of features including at least one of: a size of the package; a shape of the package; a color of the package; or predicted appearances of the package in various environmental conditions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
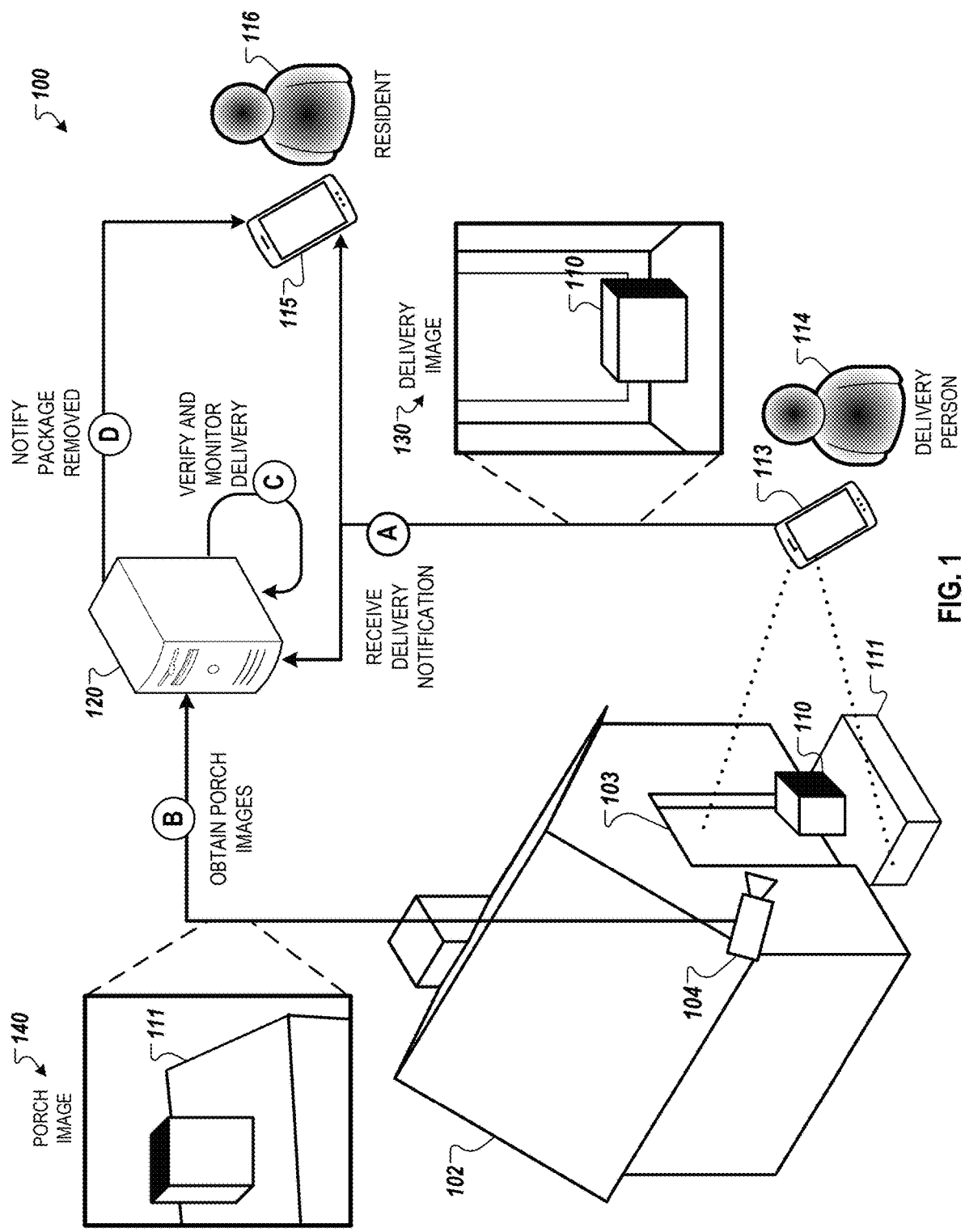
FIG. 1 illustrates an example system for monitoring delivered packages using video.

A camera 104 is installed at the property 102. The camera 104 can be, for example, a surveillance camera installed at the property 102. The camera 104 is installed external to the property 102. The camera 104 is installed near a door 103, facing a yard of the property 102. However, the camera 104 may instead be installed internal to the property 102. For example, the camera 104 may be inside the property 102 next to a window facing outwards with a clear view of a yard of the property 102.

A camera 104 is installed at the property 102. The camera 104 can be, for example, a surveillance camera installed at the property 102. The camera 104 is installed external to the property 102. The camera 104 is installed near a door 103, facing a yard of the property 102. However, the camera 104 may instead be installed internal to the property 102. For example, the camera 104 may be inside the property 102 next to a window facing outwards with a clear view of a year of the property 102.

The camera 104 can be a component of a monitoring system, e.g., a doorbell camera. In some examples, the camera 104 can be configured to record continuously. In some examples, the camera 104 can be configured to record at designated times, such as on demand, when triggered by another sensor of the monitoring system 100, or when triggered by detection of object motion within a field of view of the camera 104.

The camera 104 can capture visual images of scenes at the property within the field of view. The camera 104 may perform video analysis on captured images. Video analysis can include, for example, event detection, object detection, and object classification. In some examples, the camera 104 can send image data to a computing system, e.g., a monitoring server 120, and the monitoring server 120 can perform video analysis on the captured images. In some examples, the camera 104 and the monitoring server 120 can each perform video analysis on the captured images. For example, the camera 104 can perform object detection, while the monitoring server 120 can perform object classification.

To support communications with the monitoring server 120, the camera 104 can include a communications module, such as a modem, transceiver, modulator, or other hardware or software configured to enable the camera 104 to communicate electronic data to the monitoring server 120. The camera 104 can send data to the monitoring server 120 over a long-range data link. The long-range data link can include any combination of wired and wireless data networks. For example, the monitoring server 120 can exchange information with the camera 104 through a wide-area-network (WAN), a broadband internet connection, a cellular telephony network, a wireless data network, a cable connection, a digital subscriber line (DSL), a satellite connection, or other electronic means for data transmission. In some implementations, the long-range data link between the monitoring server 120 and the camera 104 is a secure data link (e.g., a virtual private network) such that the data exchanged between the monitoring server 120 and the camera 104 is encoded to protect against interception by an adverse third party.

The monitoring server 120 can be, for example, a remote monitoring server of the system 100. The monitoring server 120 can include one or more computer systems, server systems, or other computing devices that are located remotely from the property 102 and that are configured to process information related to the monitoring system 100 at the property 102. In some examples, the monitoring server 120 is a cloud computing platform. Although the monitoring server 120 shown in FIG. 1 receives image data from one camera installed at the property 102, the server 120 can receive image data from any number of cameras at the property 102 and can receive image data from cameras at any number of properties.

FIG. 1 illustrates a package 110 that has been delivered to the property 102 by a delivery person 114. The porch 111 is within the field of view of the camera 104. A resident 116 of the property may be located at the property 102 or at a location away from the property 102.

The package 110 can be, for example, a package ordered by the resident 116 from a delivery service, such as a bag of food or a box of consumer products. In some examples, the package 110 can be a package sent to the resident 116 by another person, such as a box of gifts sent to the resident 116 through a mail service.

The delivery person 114 may be an employee or contractor of a delivery service organization. The delivery service organization can be, for example, an internet sales company, a shipping company, or a postal service. The delivery person 114 is a person assigned to deliver the package 110 to the property 102.

The delivery person 114 is associated with mobile device 113. The resident 116 is associated with a mobile device 115. The mobile devices 113, 115 can each be, for example, a smart phone or tablet computer. The mobile devices 113, 115 each includes a communication module for communicating over one or more wireless networks. For example, the mobile devices 113, 115 can each connect to the internet using a cellular or Wi-Fi network. The mobile devices 113, 115 can each communicate wirelessly with, for example, a GPS satellite system, the monitoring server 120, the camera 104, and other computing devices. The mobile devices 113, 115 can communicate with each other, e.g., by text message, email, telephone call, or through a mobile application.

In some examples, in addition to or instead of a delivery person 114, the package 110 can be delivered by a robot or drone. For example, the package 110 can be delivered by an aerial drone or a ground transportation drone. The drone may be owned and/or operated by a delivery service and can navigate to the property 102 based on automated control technology and/or user input control provided by a user.

In some examples, the robot may include data capture and recording devices. For example, the robot may include one or more cameras. In some examples, the robot may include a communication module. The communication module can enable the robot to communicate with, for example, a GPS satellite system, the monitoring server 120, the camera 104, other robots, and other devices, e.g., the mobile device 115. The communication module can be a wireless communication module that allows the robot to communicate wirelessly.

FIG. 1 illustrates a flow of data, shown as stages (A) to (D), which can represent steps in an example process. Stages (A) to (D) may occur in the illustrated sequence, or in a sequence that is different from the illustrated sequence. For example, some of the stages may occur concurrently. The example illustrated in FIG. 1 includes one camera 104 and one package 110. However, some examples can include additional cameras and/or packages 110.

In stage (A) of FIG. 1, the monitoring server 120 receives a delivery notification. The delivery notification can be, for example, a notification that the package 110 was delivered to the property 102. The delivery notification can include, for example, an electronic mail communication, a text message, a push notification, etc. The delivery notification can include information related to the delivery. The delivery notification can also include an image of the delivered package 110, e.g., delivery image 130.

The mobile device 113 includes at least one camera. The camera can be, for example, a visible light camera. To generate the delivery image 130, the delivery person 114 can operate the mobile device 113 to capture image of the package 110 at the location where the package was delivered. In the example of FIG. 1, the delivery image is an image of the package 110 on the porch 111 of the property 102 from the perspective of the mobile device 113.

In some examples, the delivery notification can include Exchangeable Image File Format (EXIF) data. EXIF is a standard that defines information related to an image or other media captured by a digital camera. It is capable of storing data such as camera exposure, lens intrinsics, a timestamp indicating a date and time the image was captured, and a GPS location where the image was captured. In some examples, the EXIF data can be encoded into the delivery image 130.

The delivery person 114 can operate the mobile device 113 to transmit the delivery notification, including the delivery image 130, to the mobile device 115, the monitoring server 120, or both. The monitoring server 120 can receive the delivery notification from the mobile device 113 or from the mobile device 115. For example, the mobile device 115 can forward the delivery notification to the monitoring server 120 after receiving the delivery notification. In some examples, the mobile device 113 can transmit the delivery notification to a proxy address that forwards the notification to the monitoring server 120, the mobile device 115, or both. In some examples, the monitoring server 120 can intercept the delivery notification that is transmitted to the mobile device 115. In some examples, the resident 116 can opt-in through a mobile application to permissions that enable the monitoring server 120 to read delivery notifications transmitted to the mobile device 115.

The delivery notification can include information related to the delivery. For example, the delivery notification can include information indicating a sender of the package 110, an addressee of the package 110, contents of the package 110, etc. The delivery notification can also include information indicating the time of delivery of the package 110, a location where the package 110 was delivered, information indicating that the package 110 was handed to a resident, etc.

The delivery notification can include a tracking number of the package 110, information related to contents of the package 110, a name of the delivery service, a name of the delivery person 114, a mobile phone number associated with the device 113, a time of delivery, and a location of delivery. In some examples, the delivery notification can include information related to a size of the package, a shape of the package, a weight of the package, a value of the package, a fragility of the package, and a type of packaging.

In stage (B) of FIG. 1, the monitoring server 120 obtains porch images 140 from the camera 104. The porch images 140 shows the package 110 on the porch 111 from the perspective of the camera 104.

The porch images 140 can include images captured by the camera 104 and generated from any appropriate type of light. For example, the images can be generated from any combination of visible light, IR light, or UV light. The images can also be generated from RADAR, LIDAR, and/or microwave imaging. The porch images 140 can include any combination of still images, recorded video, or live-streamed video.

Although FIG. 1 shows a single camera 104, there may be multiple cameras installed at the property 102. The monitoring server 120 can obtain images from, e.g., outdoor cameras, doorbell cameras, and indoor cameras. The monitoring server 120 can also obtain additional monitoring system information from the property 102. The monitoring server 120 can obtain the monitoring system information from sensors at the property 102, from a monitoring system control unit at the property 102, or any combination of these. The monitoring system information can include, for example, data indicating an open or shut status of a door, data indicating a locked or unlocked status of a door, data indicating when a doorbell was pressed, data indicating occupancy of the property 102, data indicating an arming status of the property 102, etc.

In some examples, the monitoring server 120 can obtain image analysis data from the camera 104. For example, the camera 104 or a computing system in electrical communication with the camera 104 can perform video analysis on images captured by the camera 104 and transmit video analysis results to the monitoring server 120. The camera 104 can perform video analysis including, e.g., human detection, recognition, and tracking, object detection, recognition, and tracking, background change detection, event detection, etc. The camera 104 can send the results of the video analysis to the monitoring server 120. For example, when a person delivers a package, the camera 104 can perform video analysis to track the person to the front door, detect the package placed on the ground within the camera field of view, and estimate an outline of the package based on a region of pixels that have changed compared to the background. In some examples, the camera 104 can send the porch image 140 to the server 120 in response to a detected event, e.g., a detection of the package 110 or of the delivery person 114 using video analysis.

In some examples, the monitoring server 120 can select to obtain porch images 140 that were captured at particular times or within particular time ranges. The monitoring server 120 can determine a particular time associated with the delivery image 130. The monitoring server 120 can obtain, from the camera at the property, a set of images captured during a range of time that includes the particular time.

For example, when the monitoring server 120 receives a delivery notification, the monitoring server 120 can determine, based on the delivery notification, a particular time associated with the delivery image 130, such as a particular time that the delivery image 130 was captured. In some examples, in addition to or instead of the time that the delivery image 130 was captured, the monitoring server 120 can determine a time that the delivery notification was transmitted, a time that the delivery notification was received by the monitoring server 120, a time when the package 110 was delivered, or any combination of these. The monitoring server 120 can then request, from the camera 104, images captured by the camera 104 within a particular range of the time. The particular range of time can be, for example, a range of time that includes the time when the delivery image 130 was captured, a range of time that includes the time when the delivery notification was transmitted, a range of time that includes the time when the delivery notification was received, a range of time that includes the time when the package 110 was delivered, or any combination of these.

In some examples, the monitoring server 120 can analyze the porch images 140 to determine a time of a delivery event. For example, the monitoring server 120 can identify images included in the porch images 140 that depict likely delivery events, e.g., images of the delivery person 114 approaching the property 102 and/or the package 110 being placed on the porch 111. In some examples, the monitoring server 120 can identify images that depict the delivery person 114 using the mobile device 113 to capture the delivery image 130. Based on timestamps of the porch images 140 that show a likely delivery event, the monitoring server 120 can determine a time when the package 110 was delivered to the property 102. The monitoring server 120 can associate the delivery event with the package 110, e.g., by comparing a timestamp of the delivery image 130 with the timestamp of the delivery event. If the timestamp of the delivery image 130 is within a threshold range of time to the timestamp of the delivery event, the monitoring server 120 can determine that the delivery event corresponds to delivery of the package 110 depicted in the delivery image 130. The threshold range of time can be, for example, thirty seconds, one minute, or two minutes.

In some examples, a time that the delivery notification is received by the monitoring server 120 can be used as a backup timestamp for the timestamp of the delivery image 130. For example, the timestamp of the delivery image 130 may be inaccurate, causing a gap or discrepancy between the timestamp of the delivery image 130 and the time that the monitoring server 120 receives the delivery notification. If the monitoring server 120 determines that a gap between the timestamp of the delivery image 130 and the time that the monitoring server 120 receives the delivery notification is greater than a threshold time discrepancy, the monitoring server 120 may determine that the timestamp of the delivery image 130 is inaccurate. The monitoring server 120 can therefore use the time that the monitoring server 120 received the delivery notification as a backup timestamp, and associate the delivery event with the package 110 by comparing the time that the monitoring server 120 received the delivery notification with the timestamp of the delivery event shown in the porch images 140.

In an example, the delivery image 130 may have a timestamp of 4:11:20 pm. The monitoring server 120 can select to obtain porch images 140 that were captured within one minute of the timestamp, e.g., images captured between 4:10 pm and 4:12 pm. The monitoring server 120 can analyze the porch images 140 to determine that images captured between 4:10:45 pm and 4:11:15 show a person approaching the property 102 and then retreating from the property 102, with the closest person arriving at the porch 111 at 4:11:00 pm. The monitoring server 120 can determine that the person approaching the property and then retreating from the property 102 represents a likely delivery event. The monitoring server 120 can compare the time of the delivery event of 4:11:00 pm to the timestamp of the delivery image 130 of 4:11:20 to determine a time difference of twenty seconds. The monitoring server 120 can determine that the time difference of twenty seconds is less than a threshold time difference, e.g., of thirty seconds. Thus, the monitoring server 120 can determine that the delivery event corresponds to delivery of the package 110, and that the package 110 was delivered at 4:11:00 pm.

In some examples, upon determine the time when the package 110 was delivered, the monitoring server 120 can obtain additional data from sensors at the property 102 that was collected at or near the delivery time. For example, as described above, the monitoring server 120 may determine that the package 110 was delivered at 4:11:00 pm. The monitoring server 120 can then obtain additional images captured at or around 4:11:00 pm from other cameras installed at the property 102. The monitoring server 120 can obtain other sensor data captured at or around 4:11:00 pm, e.g., data indicating doorbell activation, data indicating motion detected by a motion sensor, data indicating whether the door 103 was opened or shut, etc.

In some examples, the monitoring server 120 can analyze the porch images 140 and determine that no delivery event occurred at the property 102. For example, the delivery image 130 may have a timestamp of 4:11:20 pm. The monitoring server 120 can analyze porch images 140 within a time range of the timestamp, e.g., porch images 140, and determine that no likely delivery events occurred within the time range. The monitoring server 120 can also obtain sensor data indicating that no motion was detected at the property at or near 4:11:20 pm, and that the doorbell was not activate at or near 4:11:20 pm. Thus, the monitoring server 120 may determine that no delivery event occurred, and that the package 110 was likely delivered to the wrong property. In response to determining that the package 110 was likely delivered to the wrong property, the monitoring server 120 can generate a wrong property notification 222 and transmit the notification to the mobile device 113 of the delivery person 114, to mobile device 115 of the resident 116, or both.

Stages (A) and (B) of FIG. 1 may be independent from one another and can occur at the same time or at different times. In some examples, the monitoring server 120 can obtain porch image 140 from the camera 104 in response to receiving the delivery notification. In some examples, the monitoring server 120 can obtain porch images 140 from the camera 104 continuously. In some examples, the monitoring server 120 can obtain porch images periodically or regularly, e.g., at designated time intervals. In some examples, the camera 104 can send porch images 140 to the monitoring server 120 in response to an event, e.g., in response to detecting motion in the field of view of the camera 104 or in response to detecting a package on the porch 111.

In stage (C) of FIG. 1, the monitoring server 120 verifies and monitors the delivery. Processes for verifying and monitoring the delivery are described in greater detail with reference to FIG. 2.

The monitoring server 120 can compare the delivery image 130 to a model of a scene that includes the porch 111 of the property 102. Based on the comparison, the monitoring server 120 can verify whether the package 110 was delivered to the correct property. The monitoring server 120 can verify that the package 110 was delivered to the correct property, for example, by determining that the delivery image 130 satisfies similarity criteria for matching the model of the scene of the property.

In some examples, the monitoring server 120 can determine that the package 110 was delivered to the correct property based on determining that the porch images 140 include, or likely include, a depiction of the package 110. The monitoring server 120 may determine that the package was delivered to the wrong property based on determining that the porch images 140 do not include, or likely do not include, a depiction of the package 110.

If the monitoring server 120 determines that the package 110 was delivered to the correct property, the monitoring server 120 can track the package 110, e.g., using camera images from the camera 104 and based on a visual model of the package generated from both the delivery image 130 and the porch image 140. If the monitoring server 120 determines that the package 110 was delivered to the wrong property, the monitoring server 120 can transmit a notification to the mobile device 113, to the mobile device 115, or both.

In some examples, multiple packages may be delivered to a property within a period of time, such as a span of a few hours. Delivery notifications might not always be sent or arrive immediately or even in the correct sequence. The monitoring server 120 can track multiple packages that are delivered to the property 102. As each package is delivered, the monitoring server 120 can verify correct delivery of each package. The monitoring server 120 can track each package and determine when each package is removed.

In some examples, the camera 104 can be a high-resolution camera, and can read the tracking number from the shipping label. The monitoring server 120 can match the tracking number read by the camera 104 with the tracking numbers included in the delivery notification in order to match a particular package with a particular notification.

In some examples, the monitoring server 120 can compare the porch images 140 to the delivery image 130. The monitoring server 120 can match the depiction of the package 110 in the porch images 140 to the depiction of the package 110 in the delivery image 130 in order to match a particular package with a particular notification. The matching can be performed based on a similarity of visual features between the depictions of the packages in the porch images 140 and in the delivery image 130.

A comparison of the depictions of the package 110 in the porch images 140 to the depictions of the package 110 in the delivery image 130 can include a comparison of features including color, position, size, shape, type, or any combination of these. For example, the position of the package 110 in the porch images 140 can be compared with the position of the package 110 in the delivery image 130. Although the camera 104 and the mobile device 113 of the delivery-person 114 are likely to be at different positions and angles, landmarks can be used to compare the relative position of the package 110 in both images. Landmarks can include, for example, an edge of the porch 111, edges of a doormat, and the door 103. Similarly, the size of the package 110 in the porch images 140 can be compared with the size of the package 110 in the delivery image. Objects included in both images can be used as a comparison benchmark to approximate the relative size of the package 110 in both images.

The shape of the package 110 in the porch images 140 can be compared with the shape of the package 110 in the delivery image 130. Shape can include features such as a ratio of width to height to depth of a box, and whether the package 110 is rectangular, cylindrical, flat, or another shape. The type of the package 110 in the porch images 140 can be compared with the type of package in the delivery image 130. The type of package can include, for example, whether the package 110 is a cardboard box, an envelope, a shopping bag, or another type of package. The type of package can be determined, for example, by an object detector or classifier.

If multiple packages are delivered in a short period of time, the packages may gather on the front porch before a resident retrieves them. When the first package is delivered, both the porch image 140 and the delivery image 130 will likely show only one package. When the second package is delivered, both images will likely show two packages. The monitoring server 120 can use the package count in both sets of images to associate which porch image 140 correspond with which delivery image 130.

In some cases, surrounding shadows in the vicinity of the porch 111 can provide timestamp information. Based on the angle and length of shadows, the monitoring server 120 can determine that a first porch image and a first delivery image were likely both captured at a similar time of day. The monitoring server 120 can determine that a second porch image and a second delivery image were likely both captured at a different time of day. Thus, the monitoring server 120 can determine that a package depicted in the first porch image is likely the same package depicted in the first delivery image, and that a package depicted in the second porch image, but not in the first porch image, is likely the same package depicted in the second delivery image.

In some cases, packages might not always be delivered to the porch 111. For example, some packages may be delivered to a mailbox. In these cases, there likely will not be a porch image depicting the package. The monitoring server 120 can eliminate these delivery notifications from consideration when comparing to porch images. For example, the monitoring server 120 can parse the delivery notification content to look for text such as "delivered in/at mailbox."

Porch images can be compared to delivery images on a real-time basis. For example, the porch images can be compared with delivery images whenever new porch images or a new delivery image is received. If there is no match between images, the imagery can be recorded as unmatched. Each time new imagery comes in, the monitoring server 120 can re-evaluate previously captured images in order to identify matches with the new imagery.

In stage (D) of FIG. 1, the monitoring server 120 sends a notification to the mobile device 115 that the package 110 has been removed. The monitoring server 120 can send the notification to the mobile device 115, e.g., over a long-range data link.

Though described above as being performed by a particular component of the monitoring systems 100 (e.g., the camera 104 or the monitoring server 120), any of the various control, processing, and analysis operations can be performed by either the camera 104, the monitoring server 120, or another computer system of the system 100. For example, the system 100 may include a control unit at the property 102. The control unit may be configured to monitor and control various sensors and devices at the property 102. The control unit may communicate with the camera 104 and other sensors over a wireless network at the property 102. The control unit, the monitoring server 120, the camera 104, or another computer system can analyze delivery images 130 and porch images 140 to verify and monitor deliveries at the property 102.

Figure 2:
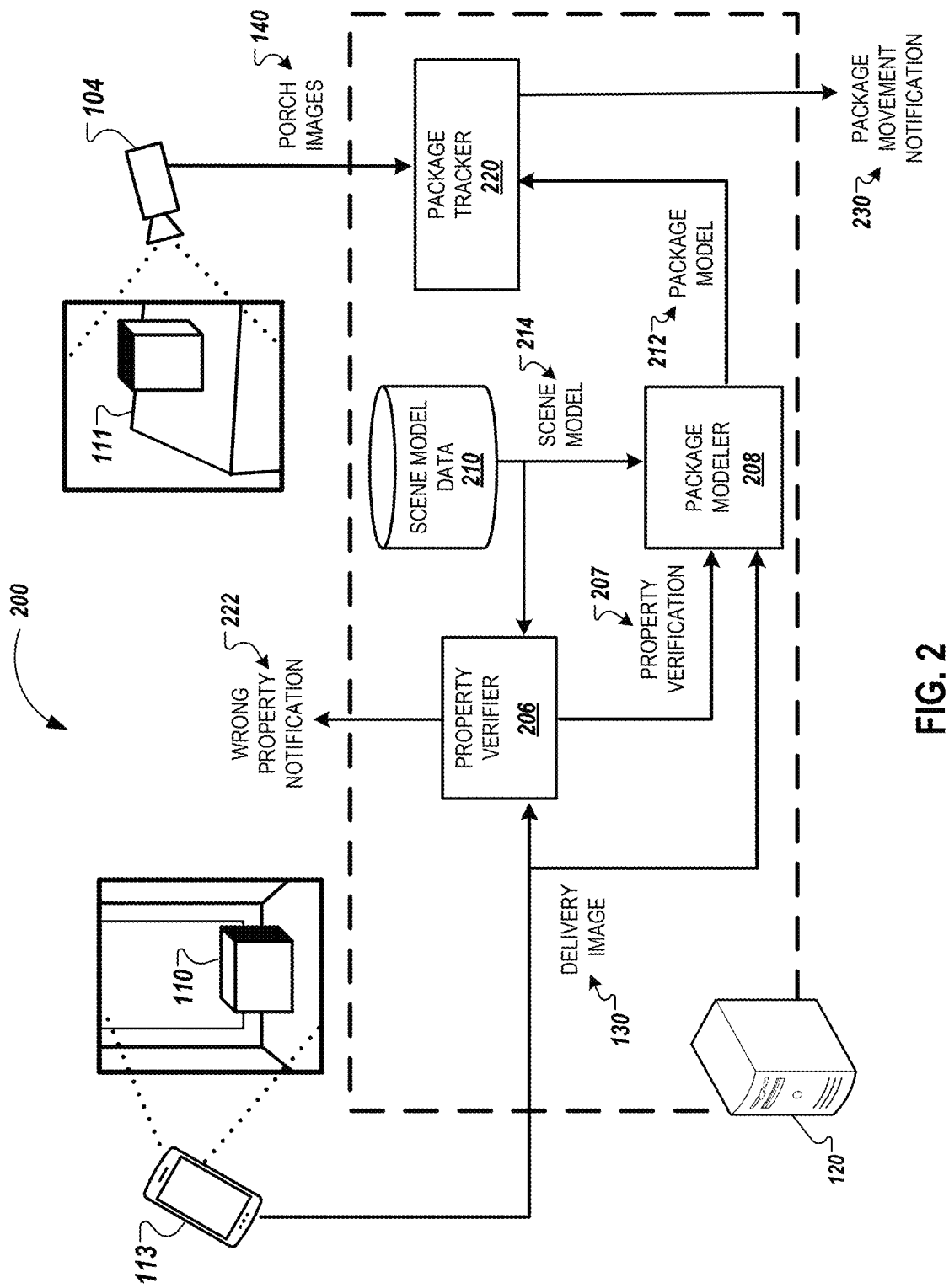
FIG. 2 illustrates an example system for verifying and monitoring a delivery.

FIG. 2 illustrates an example system 200 for verifying and monitoring a delivery. The system 200 includes the monitoring server 120. The monitoring server includes a property verifier 206, a scene model database 210, a package modeler 208, and a package tracker 220.

The monitoring server 120 receives the delivery image 130. The property verifier 206 can verify whether the package was delivered to the correct property by comparing the delivery image 130 to a scene model 214. The scene model 214 can be a model of an area of the property where packages are likely to be delivered.

The scene model database 210 stores a spatial model of one or more scenes where packages may be delivered at the property 102. For example, the scene model database 210 can store a model of a scene or scenes including the porch 111. In some examples, the scene model database 210 can build the scene model 214 using images captured by multiple installed cameras with overlapping field of view, e.g., the camera 104 and any other cameras at the property that have a field of view that includes the porch 111. Geometric relationships between the multiple cameras can be stored by the monitoring server 120. The geometric relationships can be determined using image analysis, based on programmed installation positions of the cameras, or both. In some examples, the scene model database 210 can store spatial models of scenes at multiple properties.

In some examples, the scene model 214 can be developed during a training or setup phase of the monitoring system. For example, a user can perform a survey by using a camera, e.g., a camera that is part of a mobile device, to capture video or still images of scenes at the property 102 where packages are likely to be delivered. The user can provide the captured images to the server 120. The server can store the captured images in the scene model database 210 and can use the captured images to build the scene model 214.

In some examples, the scene model database 210 can generate, build, or improve the scene model 214 over time. The scene model database 210 can build the model of the scene using images captured by the camera 104 and by any other cameras installed at the property 102. The model of the scene can be generated using images of packages included in notifications of package deliveries. For example, the scene model database 210 can build and improve the model of the scene using delivery images, e.g., the delivery image 130.

Building the scene model 214 using delivery images can improve package tracking in a number of ways. By using delivery images, the model of the scene can be generated using camera images of the scene captured from multiple perspectives. For example, the delivery images can be captured from various perspectives and distances, and therefore can provide imagery from a number of viewpoints. This allows the scene model database 210 to build a detailed three-dimensional mosaic model using multi-view geometry techniques. With a scene that includes multiple viewpoints, for example, the monitoring server 120 can determine where the edge of the porch 111 is in the field of view of the camera 104 based on the features that do not meet the homographic constraints of the ground plane from another view. Thus, delivery images received by the monitoring server 120 over time can be used to improve the accuracy of the scene model 214. Each time a delivery notification image is received, the scene model database can refine the scene model 214 and/or grow the scene model 214 so that the scene model 214 covers a greater area of space.

Building the scene model 214 using delivery notification images can expand the scene model 214 beyond the fields of view of installed cameras such as the camera 104. For example, the camera 104 is positioned adjacent to the door 103, such that the door 103 is not within the field of view of the camera 104. Some delivery images of the porch 111 can include images of the door 103, images of the camera 104, or both. Thus, the monitoring server 120 can use delivery images to generate scene model 214 including the position of the door 103 relative to the camera 104. In another example, a second camera may be installed at the property 102 such that the camera 104 and the second camera do not have overlapping fields of view. The monitoring server 120 can use delivery images to generate the scene model 214 including the position of the camera 104 relative to the second camera.

Building the scene model 214 using delivery notification images can improve robustness of the scene model 214. The delivery notification images can show the scene in various lighting and weather conditions. For example, using multi-view correlation, the monitoring server 120 can determine that image blobs of a certain color on a sidewalk are depictions of two-dimensional water spots due to rain, rather than an a three-dimensional object.

The scene model database 210 can store data indicating an estimation of the relative orientation of the ground plane including pixels of images captured by the camera 104 that correspond to the ground. The monitoring server 120 can learn which pixels correspond to the ground, e.g., using machine learning methods. The monitoring server 120 can analyze images captured by the camera 104 showing people, animals, and vehicles traversing over the ground. Based on analyzing the images, the monitoring server 120 can identify the ground plane. Identifying the ground plane can enable the monitoring server 120 to estimate the planar geometry of the scene. For example, the monitoring server 120 can assume that the porch 111 is part of the ground plane of the scene and has a planar shape.

In some implementations, upon installation, the monitoring system may have a training phase. For example, the training phase may be a period of multiple days or weeks. During the training phase, the monitoring server 120 can obtain images of all package deliveries to the property 102. The monitoring server 120 can store paths taken by delivery personnel. The monitoring server 120 can also store locations of packages that are delivered during the training phase. For example, packages may be delivered to the porch 111, to a back door, or to a garage door of the property 102. The monitoring server 120 can determine which delivery locations are located within fields of view of installed cameras at the property 102. In some examples, in addition to or instead of the training phase, the camera 104 and the monitoring server 120 can continuously store record and store delivery paths and delivery locations while in operation. The monitoring server 120 can analyze all deliveries, or a selection of deliveries.

The property verifier 206 compares the delivery image 130 to the scene model 214 to determine if the package 110 was delivered to the correct property. In some examples, the property verifier 206 can select a version of the scene model 214 based on environmental conditions at the property 102. For example, the scene model database 210 can store scene models that represent the scene at various times of day, seasons of year, precipitation conditions, etc. The property verifier 206 can select a particular version of the scene model 214 that most closely matches the current date, time, and/or weather conditions. In some examples, the scene model database 210 can store scene models for multiple properties, and the property verifier 206 can select the scene model 214 for the particular property 102.

In some examples, the property verifier 206 can compare the delivery image 130 to scene models 214 of more than one scene at the property. For example, the scene model database 210 can store scene models that represent multiple scenes, e.g., a front porch scene, a back porch scene, and a garage door scene. The property verifier 206 can select one or more of the multiple scenes to compare with the delivery image 130.

The scene model 214 can include landmarks within view of the camera 104. The landmarks can have a set of precomputed feature descriptors and/or precomputed three-dimensional poses within the scene. In some cases, the feature descriptors and poses can be learned over time using machine learning processes. In some cases, the features descriptors and poses can be measured or computed during a setup and training phase of the monitoring system. The property verifier 206 can use the landmarks to match the delivery image 130 to the scene model 214. Example landmarks can include, for example, edges and corners of the porch 111, edges and corners of the door 103, etc.

In some examples, the property verifier 206 can receive porch images 140 from the camera 104. The property verifier 206 can perform object detection and object classification on the delivery image 130, the porch images 140, or both. The property verifier 206 can use object detection and object classification to confirm the presence and/or location of the package 110 in the scene. Object detection and classification can be used to align the location of the package 110 between the porch images 140 and the delivery image 130.

In some cases, the package 110 might not be in the field of view of the camera 104 or another installed camera at the property 102. If at least part of the delivery image 130 matches the scene model 214, the property verifier 206 may be able to determine the placement of the package 110 onto the scene model.

Object detection and classification can also be used to identify the package 110 and infer the location of the package in the case where the package 110 is not in view of the camera 104 or another installed camera at the property. For example, the package 110 may be visible in the delivery image 130 but not in any other images provided to the monitoring server 120. The property verifier 206 can use object detection to detect the package in the delivery image 130, and can use feature matching to verify that features of the delivery image 130 match features of the scene model 214. For example, the property verifier 206 can perform alignment using planar homography to match features between the porch 111 in the delivery image 130 and the porch 111 in the scene model 214. The property verifier 206 can also perform scene segmentation to estimate a location of the package based on geometry of walkways, doors, or other features of the property 102.

In some examples, the property verifier 206 may determine that the delivery image 130 shows the porch 111 of the property 102, but the porch images 140 do not show the package. This may occur, for example, if a resident picks up the package 110 immediately after delivery, if the package 110 is stolen immediately after being delivered, if there is a significant delay between capturing the delivery image 130 and transmitting the delivery notification, etc.

In these examples, the monitoring server 120 can obtain additional porch images 140. For example, the monitoring server 120 may typically obtain porch images 140 captured within one minute prior to the timestamp of the delivery image 130. In the event that the package 110 is missing from the porch images 140, the monitoring server 120 may obtain additional porch images 140, e.g., porch images captured within five minutes prior to the timestamp of the delivery image 130. The monitoring server 120 can analyze the additional porch images 140 to determine whether the package 110 was correctly delivered to the property 102, and to determine whether the package 110 was picked up after delivery.

In some examples, in the event of the package 110 is missing from the porch images 140 that were obtained based on the timestamp of the delivery image 130, the monitoring server 120 may obtain additional porch images based on the time that the monitoring server 120 received the delivery notification.

As an example, the delivery image 130 may have a timestamp of 10:03 am, and the monitoring server 120 may receive the delivery notification at 10:05 am. The monitoring server 120 may obtain porch images 140 captured within a time range of one minute prior to the timestamp, e.g., porch images 140 captured between 10:02 am and 10:03 am. The property verifier 206 may determine that the package 110 is not visible in the obtained porch images captured between 10:02 am and 10:03 am. The monitoring server 120 can therefore obtain additional porch images 140, e.g., porch images captured within five minutes prior to the timestamp of the delivery image 130 between 9:58 am and 10:02 am. In some examples, the property verifier 206 can analyze the porch images 140 in reverse time order, e.g., starting with the images captured at 10:02 am and working backwards toward 9:58 am. The property verifier 206 can detect whether or not the package 110 is visible in the images, e.g., using object detection, using a comparison with the scene model 214, or both.

If the property verifier 206 determines that the package is not visible in the obtained porch images based on the timestamp of the delivery image 130, the monitoring server 120 can obtain additional porch images 140 captured within a time range based on the time that the monitoring server 120 received the delivery notification. For example, the monitoring server 120 can obtain additional porch images captured within two minutes prior to the time that the monitoring server 120 received the delivery notification, e.g., between 10:03 am and 10:05 am.

If the property verifier 206 does not detect the package 110 in a later captured image, but does detect the package 110 in an earlier captured image, the property verifier 206 can determine that the package 110 was delivered and then removed. The property verifier 206 can then generate a notification to the resident 116 indicating that the package was removed.

If the property verifier 206 does not detect the package 110 in any of the obtained porch images 140, the property verifier 206 can determine that the package 110 was delivered to the wrong property. For example, the package 110 may have been delivered to a wrong property that has a similar porch scene to the property 102. The property verifier 206 can then generate a wrong property notification 222 to the resident 116, to the delivery person 114, or both, indicating that the package was delivered to the wrong property.

In some examples, the package 110 might not be in the field of view of the camera 104, but the camera 104 may capture images indicating that a delivery occurred. For example, the delivery person 114 may walk through the field of view of the camera 104 at 2:45:00 pm and place the package 110 in a location that is outside of the field of view of the camera 104. In some cases, porch images 140 may show the delivery person 114 carrying the package 110 while approaching the property 102, and not carrying the package 110 while retreating from the property 102. The monitoring server 120 can analyze the porch images 140 to determine, based on the delivery person 114 walking through the field of view of the camera 104 at 2:45:00 pm, that a delivery event likely occurred at or near 2:45:00 pm. The monitoring server 120 can compare the time of the likely delivery event to the timestamp of the delivery image 130 to confirm that the package was delivered to the correct property.

If the property verifier 206 determines that the package 110 was delivered to the correct property, the property verifier 206 can generate a property verification 207. For example, the property verifier 206 may determine that the delivery image 130 shows a red house with a brick porch, and that the scene model 214 includes a red house with a brick porch. The property verifier 206 may determine that a pattern of the siding of the house in the delivery image 130 matches a pattern of the siding of the house in the scene model 214. The property verifier 206 may determine that a shape and size of the porch 111 in the delivery image 130 matches a shape and size of the porch 111 in the scene model 214. Based on determining that the delivery image 130 satisfies similarity criteria for matching the scene model 214, the property verifier 206 can verify that the package 110 was delivered to the correct property and provide the property verification 207 to the package modeler 208.

If the property verifier 206 determines that the package 110 was delivered to the wrong property, the property verifier 206 can generate a wrong property notification 222. For example, the property verifier 206 may determine that the delivery image 130 shows a red house with a brick porch, and that the scene model 214 includes a brown house with a wooden porch. Based on determining that the delivery image 130 does not satisfy similarity criteria for matching the scene model 214, the property verifier 206 can determine that the package 110 was delivered to the wrong property and generate the wrong property notification 222.

In some examples, the monitoring server 120 can transmit the wrong property notification 222 to a computing device associated with a resident, e.g., the mobile device 115 associated with the resident 116. In some examples, the monitoring server 120 can transmit the wrong property notification 222 to a computing device associated with the delivery person, e.g., the mobile device 113 associated with the delivery person 114. In some examples, the monitoring server 120 can transmit the wrong property notification to the same device that transmitted the delivery notification. The wrong property notification 222 can present, on a display of the mobile device 113, an indication that the package 110 was delivered to the wrong property.

In some examples, in addition to or instead of sending the wrong property notification 222, the monitoring server 120 can perform one or more actions to assist the delivery person 114 in finding the correct property. For example, the monitoring server 120 can transmit, to the mobile device 113, navigation instructions, a map, or both, to guide the delivery person 114 to the correct property. In some examples, the monitoring server 120 can transmit instructions to control one or more devices at the property 102. For example, the monitoring server 120 can transmit an instruction that causes an external light at the property to illuminate or to blink in order to signal the correct property to the delivery person 114.

If the property verifier 206 verifies that the package 110 was delivered to the correct property, the property verifier 206 can output a property verification 207 to the package modeler 208. In response to receiving the property verification 207, the package modeler 208 can generate a package model 212 using the delivery image 130 and the scene model 214.

In some examples, the package modeler 208 can select a version of the scene model 214 based on environmental conditions at the property 102. The versions of the model of the scene can include versions for various environmental conditions. For example, the scene model database 210 can store scene models that represent the scene at various times of day, seasons of year, precipitation conditions, etc. The package modeler 208 can select a particular version of the model of the scene that has an environmental condition that satisfies a similarity threshold with a current environmental condition at the property. For example, the package modeler 208 can select a particular version of the scene model 214 that most closely matches the current date, time, and/or weather conditions at the property 102. In some examples, the scene model database 210 can store scene models for multiple properties, and the package modeler 208 can select the scene model 214 for the particular property 102. In some examples, the package modeler 208 can select the same version of the scene model 214 that was selected by the property verifier 206.

The images of the package 110 from multiple views can be stored as part of a visual model of the package 110, e.g., package model 212. The package modeler 208 can generate the package model 212 including pixel boundaries of the package 110. The package modeler 208 can build a rough three-dimensional model of the package 110.

The package modeler 208 can build the three-dimensional model of the package 110 by detecting local interest points and calculating a set of feature point descriptors based on the delivery image 130, porch images 140, or both. In some cases, the package modeler 208 can then match the features across images captured by multiple cameras. Based on the matching features, EXIF metadata, camera intrinsics, or any combination of these, the package modeler 208 can estimate the camera pose of the delivery image 130 relative to the installed cameras, e.g., camera 104. The package modeler 208 can then use multi-view geometric techniques to estimate the structure of the package 110.

In some examples, the package modeler 208 can generate the package model 212 by identifying pixels in the delivery image 130 that do not match the scene model 214. Pixels that do not match between the delivery image 130 and the scene model 214 can be determined to be pixels that correspond to the package 110.

For example, when the package 110 is left on the porch 111, a region of pixels will change compared to the scene model 214. The region of pixels that are changed from the scene model 214 can be considered a change region. The change region can encompass the package 110, a shadow cast by the package, a reflection of the package, and any disturbance that may have happened during the delivery, e.g., leaves moving around, footprints, etc. Pixels within the change region will have different pixel values than corresponding pixel values of the scene model 214.

To generate the package model 212, the package modeler 208 can identify the pixels within the change region that lie on the ground plane and pixels within the change region that are located above the ground plane. The package modeler 208 can then trim the change region to only include the pixels that lie above the ground plane. For example, the matches from each camera that correspond to the ground plane can be estimated to fit a planar homography corresponding to the ground plane. Pixels within the region that do not fit the homography can be used to generate the package model.

In some examples, the package may have a planar shape. For example, the package may be an envelope or flat carton. In these examples, all of the pixels of the change region may lie along the ground plane. In these examples, the package modeler 208 can identify pixels corresponding to the package, e.g., using a segmentation algorithm. The package modeler 208 can generate the package model 212, by identifying corners and edges of the change region.

The package model 212 can be a three-dimensional reconstruction of the package 110. The package model 212 can model features of the package 110, e.g., a size, shape, and color of the package 110. In some examples, the package model 212 can include a model of markings on the package, e.g., a logo or label on the package 110. In some examples, the package model 212 can include a model of the appearance of each side of the package that is visible in at least one image.

The package model 212 can be robust to lighting changes. For example, the package model 212 can include predicted appearances of the package 110 in various lighting conditions. When lighting conditions change at the scene, the monitoring server 120 can thus determine whether changes in appearance of the package are due to movement of the package or to changes in lighting. For example, a package delivered during day time will appear differently to the camera 104 after sunset. The package model 212 can predict the appearance of the package 110 after sunset, so that the monitoring server 120 does not mistakenly detect removal of the package 110 after sunset.

The monitoring server 120 receives the porch images 140. For example, after delivery of the package 110 and verification of the property, the package tracker 220 can receive porch images 140 from the camera 104 over time. The monitoring server 120 can receive porch image 140, e.g., continuously, periodically, at designated time intervals, etc. In some examples, the monitoring server 120 can receive porch images at time intervals beginning at a time when the package 110 was delivered to the porch 111 and ending when the package 110 is removed from the porch 111. In some examples, the monitoring server 120 can continue to receive porch images until a resident confirms that that the package 110 has been picked up by a resident. In some examples, the monitoring server 120 can receive a confirmation that the package has been retrieved by an authorized person. In response to receiving the confirmation, the monitoring server 120 can determine to stop tracking the location of the package.

The package tracker 220 can monitor and track the package 110 using the package model 212 and the porch images 140. For example, after delivery of the package 110, the package tracker 220 can compare depictions of the package 110 in porch images 140 to the package model 212. If a depiction of the package 110 in a porch image 140 differs from the package model 212, the package tracker 220, the package tracker 220 can determine that the package 110 has been moved or removed.

In some examples, the package tracker 220 can compare current porch images 140 to previously obtained porch images. When the package tracker 220 receives a current porch image 140, the package tracker 220 can compare the porch image to the most recent previous porch image. If the package tracker 220 determines that the current porch image differs from the most recent previous porch image, the package tracker 220 can determine that the package 110 has been moved or removed.

In an example, the package model 212 can also include a number of pixels in the porch images 140 that correspond to the package 110. If the number of pixels that correspond to the package 110 changes between a previous porch image and a current porch image, the package tracker 220 can determine that the package 110 has been moved. If the number of the pixels that correspond to the package 110 decreases to zero or near zero, the package tracker 220 can determine that the package has been removed.

In another example, the package model 212 can include characteristics of the package 110, e.g., a size, shape, color, orientation, etc. If the characteristics of the package as observed in the porch images 140 differ from the characteristics of the package included in the package model 212, the package tracker 220 can determine that the package 110 has been moved.

As described above, the package model 212 can include predicted changes to the appearance of the package 110 over time. For example, the package model 212 can be generated based on the appearance of the package in the delivery image 130 when the package 110 is delivered at a first time, e.g., 10:00 am. The package model can incorporate features of the scene model 214 in order to predict the appearance of the package 110 at a later time of day, e.g., at 2:00 pm. In another example, the package model 212 includes a predicted appearance of the package 110 in changing weather conditions, e.g., clouds, rain, or snow. Thus, the package tracker 220 can differentiate between changes to the appearance of the package 110 that are caused by environmental factors, and changes to the appearance of the package 110 that are caused by movement of the package 110.

When package movement is detected, the package tracker 220 can transmit a package movement notification 230. The package movement notification 230 can be transmitted to a computing device associated with a resident of the property 102, e.g., the mobile device 115 associated with the resident 116.

In some examples, the package tracker 220 can transmit a package movement notification 230 to more than one resident. For example, three residents may be associated with the property 102. The package tracker 220 can transmit the package movement notification 230 to each of the three residents. In some examples, all of the residents can receive a notification including the same information. In some examples, certain residents can receive a notification including different information that other residents. For example, the delivery notification can include information indicating that the package 110 is addressed to a first resident. The package movement notification 230 transmitted to the first resident can therefore include information indicating the contents of the package 110. The package movement notification 230 transmitted to a second and third resident might not include information indicating the contents of the package 110.

In some examples, the package movement notification 230 can include prompts for the resident 116 to provide a confirmation that the package was picked up by a resident, or that the package was not picked up by a resident. For example, the package movement notification 230 can cause the mobile device 115 to display a user interface to the resident 116. The user interface can include selectable icons, e.g., a selectable icon indicating that "yes" the package was picked up by a resident or "no" the package was not picked up by a resident. After transmitting the package movement notification 230 to the resident, 116, the monitoring server 120 can receive data indicating the resident's selection.

Figure 3:
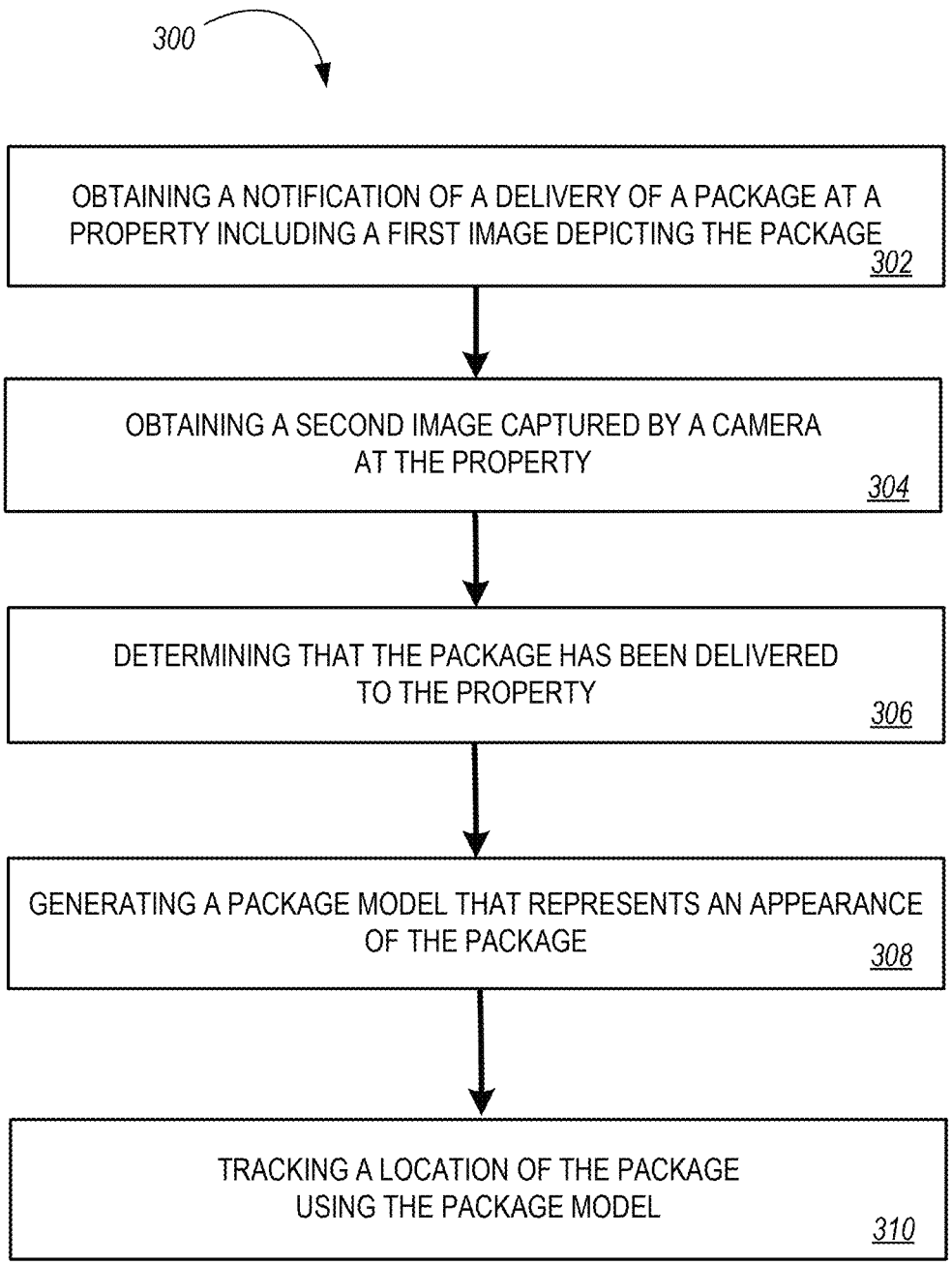
FIG. 3 is a flow diagram of an example process for monitoring delivered packages using video.

FIG. 3 is a flow diagram of an example process for monitoring delivered packages using video. Briefly, the process 300 includes obtaining a notification of a delivery of a package at a property including a first image depicting the package (302), obtaining a second image captured by a camera at the property (304), using the first image and the second image, determining that the package has been delivered to the property (306), generating, from the image of the package and the one or more images captured by the camera at the property, a package model that represents an appearance of the package (308), and tracking a location of the package based on the package model (310).

In additional detail, the process 300 includes obtaining a notification of a delivery of a package at a property including a first image depicting the package (302). For example, the monitoring server 120 can obtain a delivery notification including the delivery image 130 showing the package 110 on the porch 111 of the property 102. The delivery image 130 can be an image captured by the delivery person 114 using a camera of mobile device 113.

The process 300 includes obtaining a second image captured by a camera at the property (304). For example, the monitoring server 120 can obtain porch images 140 obtained by the camera 104. The porch images 140 include the second image and show the porch 111 of the property 102.

The process 300 includes, using the first image and the second image, determining that the package has been delivered to the property (306). For example, the monitoring server 120 can use previously captured porch images 140 to generate a scene model 214 of the porch 111. The property verifier 206 can then compare the delivery image 130 to the scene model 214. The property verifier 206 can compare the delivery image 130 to the second image included in the porch images 140. The property verifier 206 can determine, based on the comparing, that the delivery image 130 satisfies similarity criteria for matching the second image. If features of the delivery image 130 satisfy criteria for matching features of the scene model 214, the property verifier 206 can determine that the package 110 has been delivered to the property 102. In some examples, the property verifier 206 can compare the delivery image 130 to the porch images 140. If features of the delivery image 130 satisfy criteria for matching features of the porch images 140, the property verifier 206 can determine that the package 110 has been delivered to the property 102. In some examples, the property verifier 206 can determine that the package has been delivered to the property based on determining that the second image, included in the porch images 140, depicts the package 110.

The process 300 includes generating a package model that represents an appearance of the package (308). For example, the package modeler 208 can generate the package model 212 that represents the appearance of the package 110. In some examples, the package modeler 208 can generate the package model using the delivery image 130 and the model of the scene. The package modeler 208 can select, from multiple versions of the model of the scene, a particular version of the model of the scene for generating the package model. The package modeler 208 can identify a group of pixels in the delivery image 130 that do not match the model of the scene, and can classify, within the group of pixels, a subset of pixels as corresponding to the package. In some examples, classifying the subset of pixels as corresponding to the package includes determining that the subset of pixels does not lie in a ground plane of the delivery image 130.

The process 300 includes tracking a location of the package using the package model (310). For example, the package tracker 220 can track the location of the package 110 using the package model 212. If the appearance of the package 110 in the porch images 140 does not satisfy similarity criteria for matching the package model 212, the package tracker 220 can determine that the package 110 has been moved or removed.

The package tracker 220 can track the location of the package 110 for use in determining whether to provide an alert to a device about the location of the package. Tracking the location of the package using the package model can include obtaining a third image captured by the camera at the property, where the third image is captured after the second image. The third image can be compared to the package model. Based on determining that an appearance of the package in the third image does not satisfy similarity criteria for matching the package model, the package tracker 220 can determine that the package has been moved. Based on determining that an appearance of the package in the third image satisfies similarity criteria for matching the package model, the package tracker 220 can determine that the package has not been moved.

Figure 4:
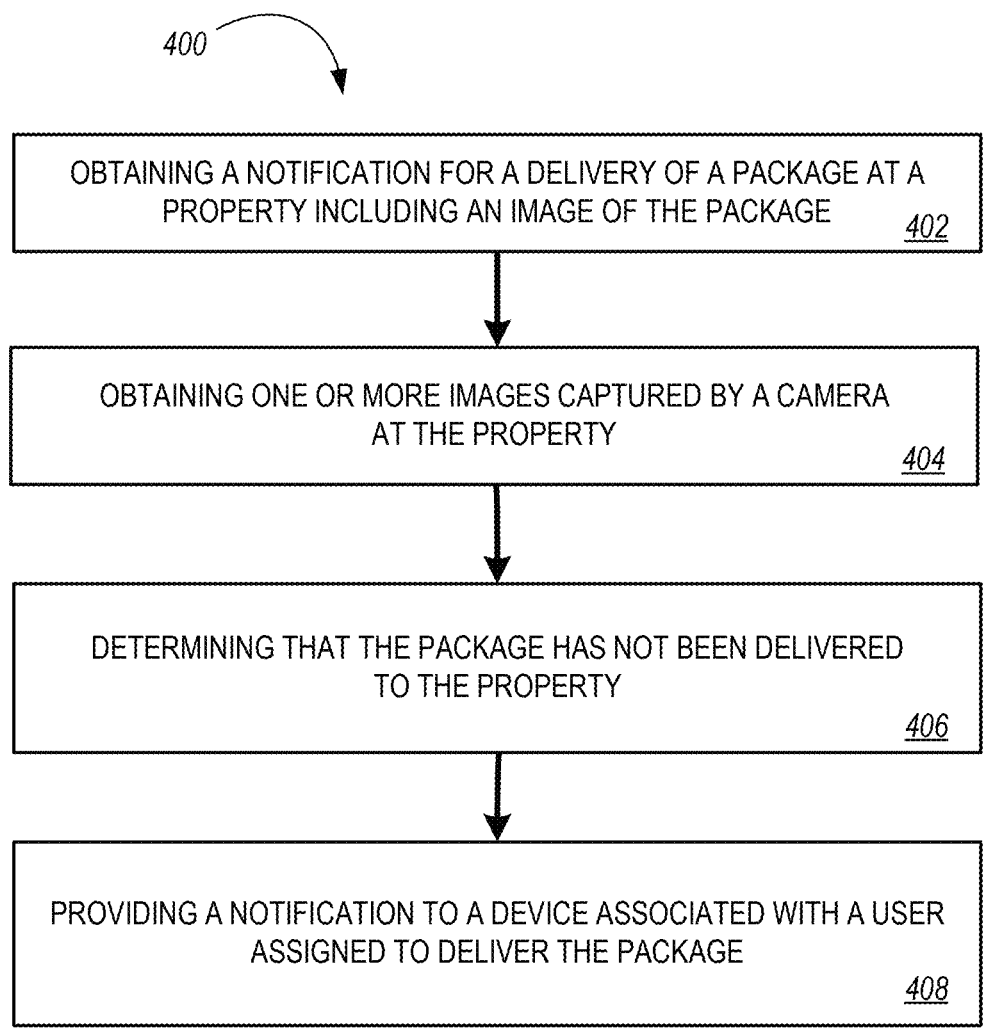
FIG. 4 is a flow diagram of an example process for verifying whether a package was delivered to a property.

FIG. 4 is a flow diagram of an example process for verifying whether a package was delivered to a property. Briefly, the process 400 includes obtaining a notification of a delivery of a package at a property including an image of the package (402), obtaining one or more images captured by a camera at the property (404), based on the image of the package and the obtained one or more images captured by the camera at the property, determining that the package has not been delivered to the property (406), and in response to determining that the package has not been delivered to the property, providing a notification to a device associated with a user assigned to deliver the package (408).

In additional detail, the process 400 includes obtaining a notification of a delivery of a package at a property including an image of the package (402). For example, the monitoring server 120 can obtain a delivery notification including the delivery image 130 showing the package 110 on the porch 111 of the property 102. The delivery image 130 can be an image captured by the delivery person 114 using a camera of mobile device 113.

The process 400 includes obtaining one or more images captured by a camera at the property (404). For example, the monitoring server 120 can obtain porch images 140 obtained by the camera 104. The porch images 140 show the porch 111 of the property 102.

The process 400 includes, based on the image of the package and the obtained one or more images captured by the camera at the property, determining that the package has not been delivered to the property (406). For example, the monitoring server 120 can use porch images 140 to generate a scene model 214 of the porch 111. The property verifier 206 can then compare the delivery image 130 to the scene model 214. If features of the delivery image 130 do not satisfy criteria for matching features of the scene model 214, the property verifier 206 can determine that the package 110 has not been delivered to the property 102. In some examples, the property verifier 206 can compare the delivery image 130 to the porch images 140. If features of the delivery image 130 do not satisfy criteria for matching features of the porch images 140, the property verifier 206 can determine that the package 110 has not been delivered to the property 102.

The process 400 includes in response to determining that the package has not been delivered to the property, providing a notification to a device associated with a user assigned to deliver the package (408). For example, in response to determining that the package 110 has not been delivered to the property 102, the property verifier 206 can generate a wrong property notification 222. The property verifier 206 can provide the wrong property notification to the mobile device 113 associated with the delivery person 114 who was assigned to deliver the package 110 to the property 102.

Figure 5:
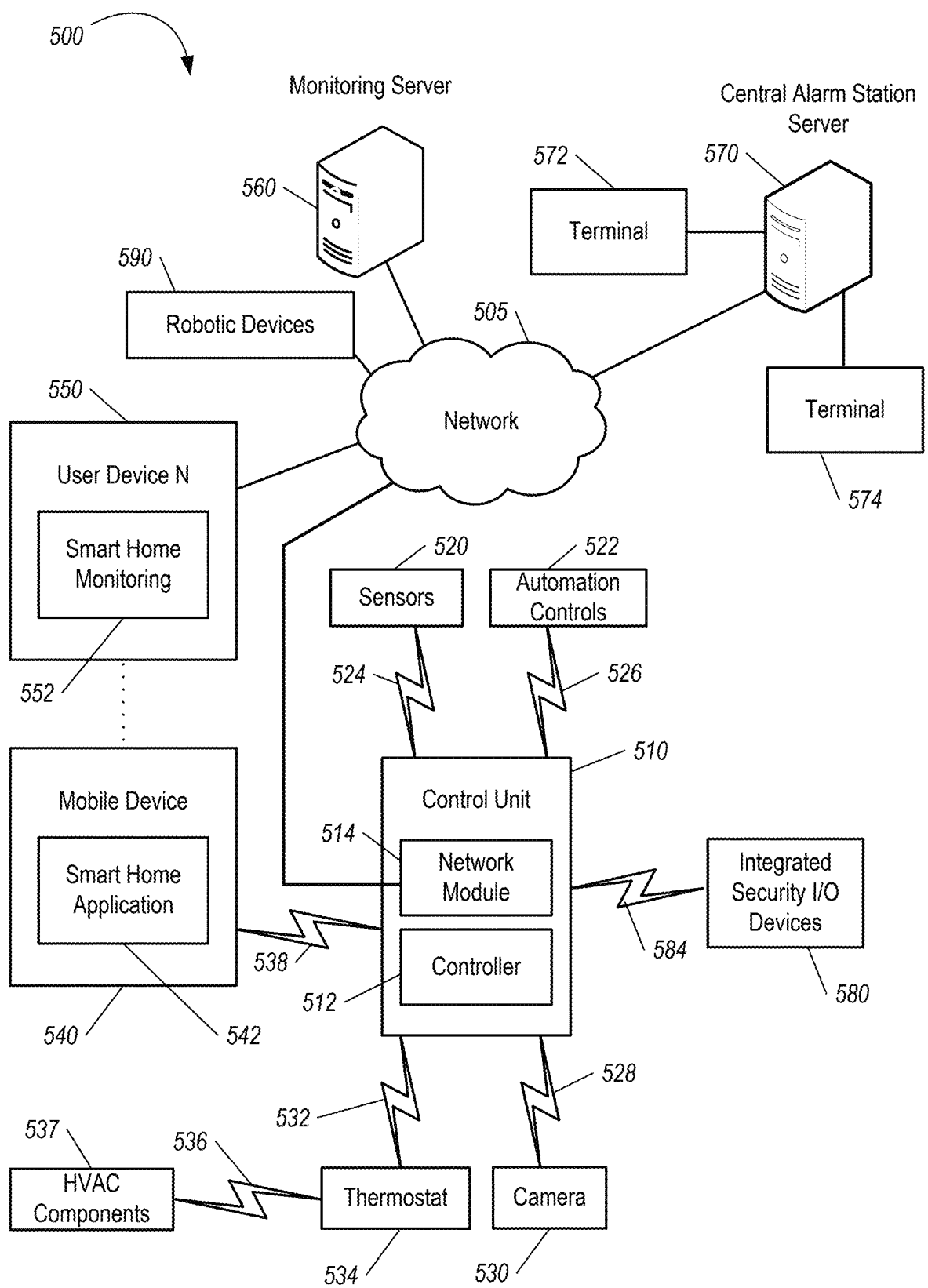
FIG. 5 is a diagram illustrating an example of a monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
obtaining a notification i) of a delivery of a package at a property ii) that includes a first image depicting the package;
comparing the first image from the notification depicting the package to a model of a scene that represents an area of the property;
determining whether the first image satisfies similarity criteria for matching the model of the scene using a result of the comparison;
in response to determining that the first image satisfies the similarity criteria for matching the model of the scene, determining that the first image likely depicts the same area of the property as the area of the property represented by the scene;
in response to determining that the first image likely depicts the same area of the property as the area of the property represented by the scene, determining that the package has been delivered to the property;
generating a package model that represents an appearance of the package, including:
identifying a group of pixels in the first image that do not match the model of the scene; and
classifying, within the group of pixels, a subset of pixels as corresponding to the package, including determining that the subset of pixels does not lie in a ground plane of the first image; and
tracking, using the package model, a location of the package for use in determining whether to provide an alert to a device about the location of the package.

2. The method of claim 1, comprising:
obtaining a second image captured by a camera at the property; and
determining that the second image likely depicts the package,
wherein determining that the package has been delivered to the property is further responsive to determining that the second image likely depicts the package.

3. The method of claim 1, wherein the model of the scene comprises a spatial model of background objects in an area of the property where packages are likely to be delivered.

4. The method of claim 1, comprising at least one of:
generating the model of the scene using camera images of the scene captured from multiple perspectives, or
generating the model of the scene using images of packages included in notifications of package deliveries.

5. The method of claim 1, comprising:
selecting, from a plurality of versions of the model of the scene, a particular version of the model of the scene for generating the package model.

6. The method of claim 5, comprising:
maintaining the plurality of versions of the model of the scene including versions for various environmental conditions; and
selecting, using a current environmental condition at the property, the particular version of the model of the scene that has an environmental condition that satisfies a similarity threshold with the current environmental condition at the property, wherein generating the package model uses the first image and the particular version of the model of the scene.

7. The method of claim 2, wherein determining that the package has been delivered to the property comprises:
comparing the first image depicting the package to the second image captured by the camera at the property; and
determining, based on comparing, that the first image satisfies similarity criteria for matching the second image.

8. The method of claim 2, wherein obtaining the second image captured by the camera at the property comprises:
determining a particular time associated with the first image; and
obtaining, from the camera at the property, a set of images captured during a range of time that includes the particular time, wherein the set of images includes the second image, wherein the particular time associated with the first image comprises one of:
a time when the first image was captured;
a time when the notification of the delivery of the package was obtained; or
a time when the package was delivered.

9. The method of claim 2, wherein:
the second image is captured at a first time, and
tracking the location of the package using the package model comprises:
obtaining a third image captured by the camera at the property, wherein the third image is captured after the second image;
comparing the third image captured by the camera at the property to the package model; and
based on determining that an appearance of the package in the third image does not satisfy similarity criteria for matching the package model, determining that the package has been moved within a field of view of the camera.

10. The method of claim 2, wherein:
the second image is captured at a first time, and
tracking the location of the package using the package model comprises:
obtaining a third image captured by the camera at the property, wherein the third image is captured after the second image;
comparing the third image captured by the camera at the property to the package model; and
based on determining that an appearance of the package in the third image satisfies similarity criteria for matching the package model, determining that the package has not been moved.

11. The method of claim 1, comprising:
determining, based on tracking a location of the package using the package model, that the package has been moved; and
providing a notification to a resident of the property indicating that the package has been moved.

12. The method of claim 1, comprising:
receiving a confirmation that the package has been retrieved by an authorized person; and
determining to stop tracking the location of the package.

13. The method of claim 1, wherein the package model comprises a model of features including at least one of:
a size of the package;
a shape of the package; or
a color of the package.

14. A system comprising one or more computers and one or more computer storage media storing instructions that are operable, when executed by the one or more computers, to cause the one or more computers to perform operations comprising:

obtaining a notification i) of a delivery of a package at a property ii) that includes a first image depicting the package;

comparing the first image from the notification depicting the package to a model of a scene that represents an area of the property;

determining whether the first image satisfies similarity criteria for matching the model of the scene using a result of the comparison;

in response to determining that the first image satisfies the similarity criteria for matching the model of the scene, determining that the first image likely depicts the same area of the property as the area of the property represented by the scene;

in response to determining that the first image likely depicts the same area of the property as the area of the property represented by the scene, determining that the package has been delivered to the property;

generating a package model that represents an appearance of the package, including:

identifying a group of pixels in the first image that do not match the model of the scene; and classifying, within the group of pixels, a subset of pixels as corresponding to the package, including determining that the subset of pixels does not lie in a ground plane of the first image; and tracking, using the package model, a location of the package for use in determining whether to provide an alert to a device about the location of the package.

15. A non-transitory computer-readable medium storing software comprising instructions executable by one or more computers which, upon such execution, cause the one or more computers to perform operations comprising:

obtaining a notification i) of a delivery of a package at a property ii) that includes a first image depicting the package;

comparing the first image from the notification depicting the package to a model of a scene that represents an area of the property;

determining whether the first image satisfies similarity criteria for matching the model of the scene using a result of the comparison;

in response to determining that the first image satisfies the similarity criteria for matching the model of the scene, determining that the first image likely depicts the same area of the property as the area of the property represented by the scene;

in response to determining that the first image likely depicts the same area of the property as the area of the property represented by the scene, determining that the package has been delivered to the property;

generating a package model that represents an appearance of the package, including:

identifying a group of pixels in the first image that do not match the model of the scene; and classifying, within the group of pixels, a subset of pixels as corresponding to the package, including determining that the subset of pixels does not lie in a ground plane of the first image; and tracking, using the package model, a location of the package for use in determining whether to provide an alert to a device about the location of the package.

16. The method of claim 1, wherein the package model includes predicted appearances of the package in various environmental conditions.

17. The method of claim 1, wherein determining whether the first image satisfies the similarity criteria for matching the model of the scene comprises determining, using the result of the comparison, whether the first image satisfies the similarity criteria for matching the model of the scene and that the package was not delivered to a location other than the area of the property represented by the scene.

18. The method of claim 1, comprising:

maintaining a plurality of versions of the model of the scene including versions for various environmental conditions; and selecting, using a current environmental condition at the property, a particular version of the model of the scene that has an environmental condition that satisfies a similarity threshold with the current environmental condition at the property, wherein comparing the first image from the notification depicting the package to the model of a scene that represents the area of the property comprises comparing the first image to the particular version of the model of the scene.

\* \* \* \* \*